Patented July 21, 1936

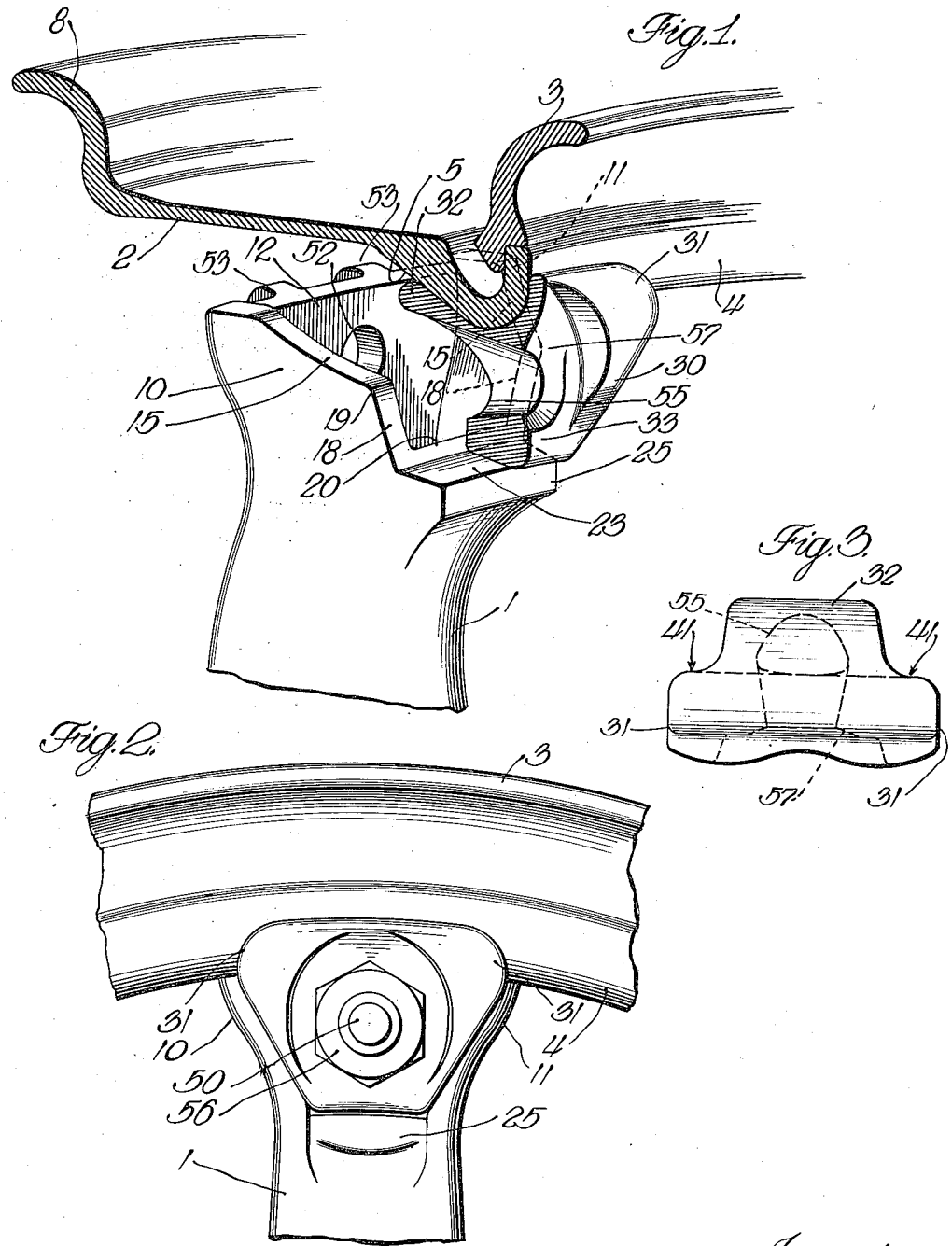

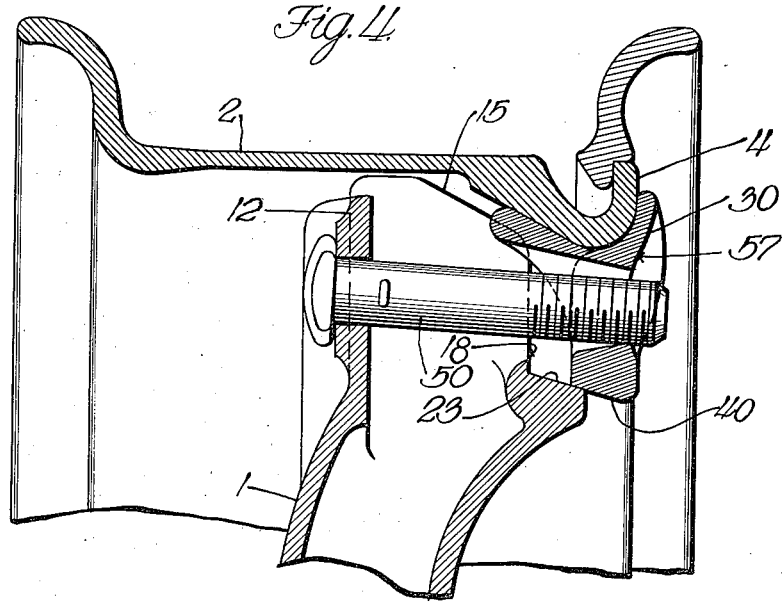
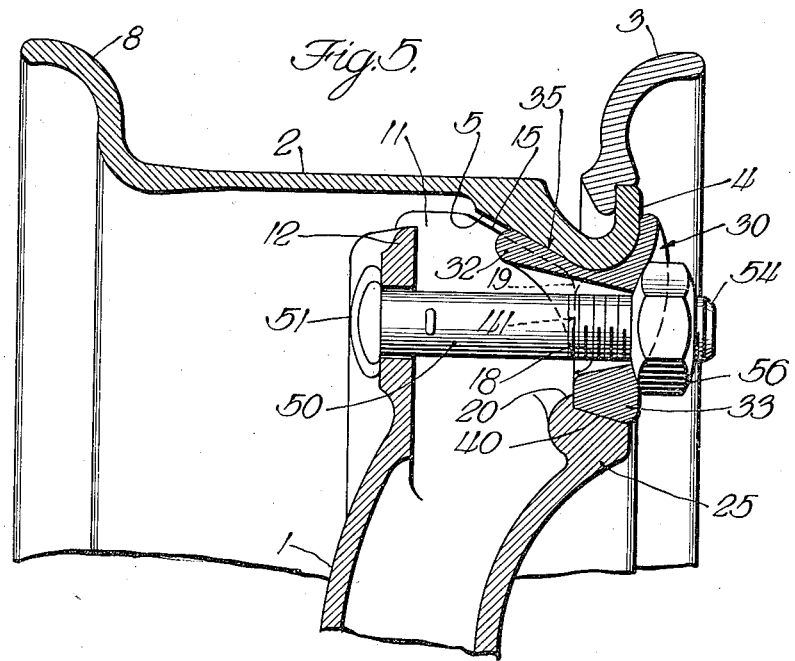

2,048,177

UNITED STATES PATENT OFFICE 2,048,177

SPOKE END MOUNTED WHEEL

Frederick W. Burger, Niles, Mich., assignor to Clark Equipment Company, Buchanan, Mich., a corporation of Michigan Application January 9, 1933, Serial No. 650,744

13 Claims. (Cl. 301—12)

The present invention relates generally to wheels and is particularly concerned with a new and improved rim mounting for the wheels of vehicles, such as automobiles, trucks, busses and the like. Particularly, the present invention contemplates the provision of a new and improved spoke end mounted wheel in which the rims are mounted directly on the radially outer ends of the spokes forming a part of the spider or wheel body.

The principal object of the present invention is to produce a rim mounting which will insure a true running rim, that is, one which is accurately aligned on the wheel hub or body, both radially and laterally. In all of the present constructions now in use, so far as I am aware, there is a decided tendency for the rims to run out of true. This means that the rim does not rotate in the general plane of the wheel but wobbles back and forth, occasioning excessive wear on the tire and other deleterious effects. Also, where the rims are out of true radially, vertical oscillations of the axle and the vehicle body result with accompanying excessive wear on certain portions of the tires.

When inflated pneumatic tires and their rims are to be mounted on wheels in the constructions of the prior art, the accuracy of the mounting and the firmness with which the rim is held on the wheel depends almost entirely upon the care given by the attendant in mounting the wheel. If certain lugs are tightened more than others the rim is thrown off center, usually both radially and laterally, with the disadvantages mentioned above. The rims for truck wheels and bus wheels and similar vehicles are quite heavy and are not easily manipulated, as a result of which most attendants do not take the trouble to see that all of the lugs are tightened the same amount so that the rims will be properly centered on the wheels. Furthermore, it is practically impossible for an attendant to draw up the lugs with anything approaching the same degree of tension because in determining the tension the operator must necessarily rely upon his own muscular sense in determining whether or not the proper tension has been reached. As is well known, the attendant's reactions in this respect are not to be relied upon, mainly because fatigue, temporary or otherwise, enters in as a disturbing factor.

With these conditions in mind, the present invention contemplates the provision of lug means which accurately and definitely locate the rim in a predetermined fixed position with respect to the wheel body, both radially and laterally thereof, so that if the lug means is fully tightened by no possibility can the rim be disposed out of a true running position. This result is accomplished by forming the wheel body with abutments or stops which limit the movement of the lug means with respect thereto so that when the lug means has been drawn up tight the stop means or the equivalent effectively position the lug means in circles or surfaces which are accurately concentric with respect to the wheel body. Since the lug means is then held in proper position it follows that the rim, with which said lug means is engaged, is also maintained in a predetermined fixed position. In order to insure that this will result, the lug means of the present invention is preferably formed so that they engage the rim in a given relation which does not materially vary. Preferably, the lug means is so formed that during the clamping of the rim on the wheel the lug means moves bodily with the rim until said predetermined position on the wheel body has been attained.

Another object of the present invention is to provide a means for mounting a rim on a wheel body which is movable, generally speaking, in a radially outward direction to a given predetermined and definite position with respect to the wheel body, the several lug means in so moving to their definite positions reacting against the resiliency of the rim to hold the latter on the wheel body, said rim chording between the points of contact between the various lug means.

A further object of the present invention is the provision of new and improved lug means movable with respect to the wheel body for tightening the rim on the wheel body, which lug means is so constructed and arranged that the center of pressure between the lug means and the rim is offset with respect to the center of pressure between the lug means and the wheel body, the amount and direction of offset being such that as soon as the clamping means, which holds the lug means against the wheel body, is released the effect of the tension of the rim against the lug means is to spring the latter away from the wheel body, whereby the removal of a rim is greatly facilitated.

These and other objects of the present invention will be apparent to those skilled in the art after a consideration of the following detailed description of a construction in which the principles of the present invention have been embodied in connection with the accompanying drawings illustrating such construction.

In the drawings:

Figure 1 is a perspective view, certain parts being shown in section, of a spoke end mounted wheel embodying the principles of the present invention;

Figure 2 is a side elevation of the construction shown in Figure 1;

Figure 3 is a top view of one of the lugs employed;

Figure 4 is a transverse section taken through the rim and spoke shown in Figure 1, showing the position of the rim and the lug means before the rim has been fully tightened on the wheel body; and Figure 5 is a transverse section corresponding rim and spoke end shown in Figure 1, the lug means and the rim being shown in the position they occupy when clamped on the spokes or wheel body.

Referring now to the drawings, the reference numeral 1 indicates a spoke of a felloe-less wheel, that is, a wheel of the type in which the demountable rims are mounted directly on the radially outer ends of the spokes of the spider or wheel body. The rim is indicated by the reference numeral 2 and it will be seen that this rim is of a conventional type embodying a demountable marginal flange 3 received within the gutter portion 4 of the rim, the gutter 4 being formed adjacent one edge of the rim and presenting a radially inner surface 5 which is beveled or tapered so as to lie in the surface of a cone the axis of which coincides with the central axis of the rim 2. The marginal flange of the rim 2 opposite the demountable flange 3 is indicated by the reference numeral 8, and between the flanges 3 and 8 the casing of a pneumatic tire is adapted to be mounted in the usual manner.

The construction of the radially outer end of the spoke 1 is best indicated in Figure 1. The spoke end is provided with a pair of oppositely disposed flared side walls 10 and 11 and a back wall 12 joining the flared sections. The sections 10 and 11 are also slightly curved generally about the radial axis of the spoke itself. The front portions of the sections 10 and 11 are beveled or tapered, as at 15, at an angle corresponding in general to the tapered portions 5 of the rim 2. The radially outwardly facing tapered portions 15 thus lie in the surface of a cone the axis of which coincides with the axis of the wheel body 1.

Outwardly, the tapered sections 15 merge into abutment surfaces 18 which are disposed in a plane parallel with respect to the general plane of the wheel, that is to say, the abutment surfaces 18 lie in a vertical plane when the wheel is vertical. The abutment surfaces 18 are joined to the tapered seats 15 by rounded portions 19 and are connected together by a lip section 20 which forms a continuation of the surfaces 18 and is disposed in the same plane.

The abutment surfaces are disposed radially outwardly of a beveled or tapered surface 23 which is formed on a laterally outwardly extending projection or shelf 25. The beveled surfaces 23 on the several spoke ends are accurately formed and are disposed in the surface of a cone having an axis coinciding with the axis of the wheel itself. The taper of the beveled surface 23 is somewhat less than the taper of the surfaces 5 and 15 formed, respectively, on the rim 2 and the spoke sections 10 and 11. In one embodiment of the present invention the surfaces 23 are formed on a taper which makes approximately an angle of 15 degrees with respect to the axis of the wheel while in the conventional rim the angularity of the tapered section 5 is approximately 28 degrees.

The lug means associated with the spoke end 1 is of novel formation and comprises a lug 30 having circumferentially extending wing sections 31, an axially extending lip or projection 32 and a radially inwardly disposed abutment or base section 33. The radially outwardly disposed portion of the lug 30, including the wings 31 and the lip section 32, are formed to provide a trough-like groove or seat adapted to accurately fit the gutter 4 of the rim 2. As best shown in Figures 1 and 2, the lug 30 has a relatively extensive area of contact with the marginal gutter portion 4 of the rim so as to exert both radially and axially directed forces on the rim and that, when the rim is seated in the trough-like section 35, the lug is not readily changed in angular position with respect to the rim by the reactions involved.

The radially inwardly disposed face or abutment portion 33 of the lug 30 is accurately beveled to fit against the beveled surface 23 on the associated spoke end. Like the surfaces 23, this beveled surface on the lug 30, indicated at Figure 2 by the reference numeral 40, is also tapered to make an angle of approximately 15 degrees with respect to the axis of the wheel.

The lug is also provided with vertically disposed surfaces 41 which are adapted to contact with the abutment surfaces 18 on the spoke end. Preferably, the vertical surfaces formed on the lug 30 are disposed on opposite sides of the lip 32, as best shown in Figure 3. These surfaces 41 are adapted to come into contact with the abutment surfaces 18 on the spoke end so as to limit the laterally inward movement of the lug 30 with respect to the associated spoke end. In this connection, the surface 20 also serves to limit the laterally inward movement of the lug. The abutments 18 therefore serve as stop means limiting the movement of the lugs with respect to the wheel body and form an important feature of the present invention as will be described somewhat in detail later.

Each of the lugs 30 are adapted to be tightened against the associated spoke end by bolt means of more or less conventional construction. In the drawings, the bolt is indicated by the reference numeral 50 and has a head 51 seated against the back wall 12, the bolt shank passing through an opening 52 formed therein. Suitable means, such as projections 53, are formed on the laterally inner surface of the back wall 12 and cooperate with the head 51 to prevent the bolt from turning when the nut is tightened. The bolt 50 is provided with a threaded end 54 which projects through a tapered opening 55 formed in the lug, the opening 55 being tapered to provide for a certain amount of angular movement between the lug and the bolt 50. A nut 56 is adapted to be threaded onto the bolt 50 to clamp the lug on the wheel. The laterally outer surface 57 of the lug is formed substantially spherical, and the same is true of the inner portion of the nut 56 so that when the latter is tightened substantially uniform clamping pressure is exerted, irrespective of the angular position of the bolt with respect to the lug.

When the rim 2 is first positioned on the wheel body 1 the relation of the parts are indicated in Figure 4. It will be seen that the tapered surfaces 15 on the wheel body serve as initial centering means when the rim 2 is first placed over the spoke ends. Next, the lugs 30 are positioned on the bolts 50 with the groove or trough-like sections 35 seated against the gutter 4 of the rim. Since these cooperating parts are formed so as to substantially interfit with one another, after the lugs have been seated against the gutter 4 the rim and lugs move bodily together. When the lugs 30 are first applied the tapered surface 40 of the base portion thereof engages the radially innermost portion of the tapered surface 23 on the spoke ends, see Figure 4. Then the nut 56 is threaded onto the end of the bolt 50 with the spherical surface thereof engaging the concave spherical depression 57 in the lug. Tightening the nut 57 causes the lug to be moved laterally inwardly and radially outwardly along the beveled surface 23. During this movement the rim 2 moves bodily laterally inwardly with the lug 30 and the radially outward component of this movement places tension in the rim by chording the same between adjacent lugs. By chording is meant the straightening out of the normally circular section between the points of application of the radially outwardly directed forces, that is, at the lugs 30.

Tightening of the lugs 30 is continued until each one has been brought up against the planar abutment surface 18. The surfaces 18 and 23 are accurately formed on the wheel body so that when all of the lugs have been brought to this definite and predetermined position, the lateral and radial positions of the trough-like portions 35 of the lugs are accurately determined and are so disposed as to lie in circles which are accurately concentric with respect to the axis of the wheel. Thus, as the various lugs come into contact with the abutment surfaces 18 the movement of the lugs terminates, and the position assumed by the lugs is a location which has been accurately determined during the manufacture of the wheel body. Thus the rim is necessarily and definitely located in a true running position since the position of the lugs with respect to the rim is an invariable. Any variations in the size of the rims 2 will be taken care of by permissive variation in the amount of chording resulting from the expansive action of all of the lugs, this being, as mentioned above, a fixed and predetermined amount, determined by the angularity of the surfaces 23 and 40 and the lateral position of the abutments 18.

In releasing the rim clamping means to remove the rim from the wheel, the lug means and associated parts described above are so arranged that merely loosening the nuts 56 to relieve the clamping tension exerted by the bolts 50 will allow the resiliency of the rim 2 to spring the lugs away from their positions on the spoke ends. That is, where, in the previous constructions, particularly those employing wedges and the like, it was necessary to jar the rim by striking the same in order to loosen the wedges, even after the clamping means was entirely removed from the wedge lugs, the construction in which the principles of the present invention are preferably embodied is not subject to these disadvantages.

Referring particularly to Figure 5, and considering the area of contact between the lug 30 and the rim 2, it will be observed that the center of pressure between these contacting surfaces is disposed substantially adjacent the laterally innermost edge of the lug 30, that is, substantially in line with the surfaces 41 and the cooperating abutment surfaces 18. Since the center of reaction between the base surface 40 of the lug 30 and the tapered or beveled surface 23 is disposed substantially between the laterally innermost and laterally outermost portions of the base 33, it will be seen that the reaction of the resiliency of the rim of the lug 30 creates a force couple which tends to swing the lug 30 in a counterclockwise direction as viewed in Figure 5. This motion is permitted by a small amount of shifting of the lug with respect to the rim 2 in a counterclockwise direction when the nut 56 is released, and this movement of the lug, that is, its movement in a counterclockwise direction as viewed in Figure 5, causes the radially outer portions 41 of the lug to rock about the radially outer or rounded portions 19 of the abutment surfaces 18 as a fulcrum, thereby shifting or swinging the beveled surface 40 to the right as viewed in Figure 5 with respect to the beveled surface 23. Since this movement of the base of the lug is toward the portion of the beveled surface 23 of smaller diameter, the lug is thus released without requiring anything further than the unscrewing of the nut 56. It may therefore be considered that the lugs 30 are in a position of unstable equilibrium, being retained in that position only by the tension of the clamping bolts 50 and associated nuts 56.

It is also to be observed that when the lugs 30 are tightened and are brought to their predetermined position against the abutments 18 with the rim cradled in the trough-lke grooves formed in the radially outer portions of the lugs, the clamping bolts 50 holding the lugs 30 in their fixed position exert a force which is applied to the lug intermediate the radially inner and outermost portions or terminations of the abutment surfaces 18. This is an important relation since the lateral thrusts imposed on the rim 2 are resisted by the tension in the clamping bolts 50 and by the reaction of the lugs against either the upper or the lower portions of the abutment surfaces 18, depending upon the direction, that is, whether laterally inwardly or laterally outwardly, in which the thrusts are imposed. In this way, when the lugs 30 are brought firmly against the abutment surfaces 18 the lugs, and the rim cradled in the trough-like grooves 35 thereof, are effectively and securely clamped onto the wheel body 1 in a definitely fixed predetermined position.

The required chording of the rim to secure the necessary reaction to hold the rim on the wheel body is, in the present construction, entirely independent of the force exerted by the attendant in clamping the lugs in place. Formerly, particularly where wedge lugs and the like were employed, the more the clamping bolts were tightened the greater was the chording of the rim. Careless attendants would too frequently draw up certain of the lugs beyond their normally clamped position so that when the remaining lugs were tightened not only was the rim excessively chorded at certain portions but also, under certain conditions where felloe-less wheels were employed, some of the spokes were actually bent out of line. Naturally this required considerable force which was imposed upon the rim and tended at all times to distort the same. The construction illustrating the present invention is not subject to these disadvantages because, by virtue of the accurately formed stop means and the associated lugs, the position of the rim on the wheel body is accurately determined and is not disturbed by careless habits, such as uneven tightening of the clamping lugs.

As a matter of fact, the rim mounting means of the present invention is entirely independent of the uniform tightening of the clamping means. So far as I am aware, this result has never been secured in the prior art. In order to correctly position the rim concentrically on the wheel body in prior art constructions, it was necessary to tighten the clamping lugs uniformly, and this was accomplished by the cumbersome method of tightening each clamping lug a slight amount and thus progressing around the wheel, giving each clamping lug a fraction of a turn. In the present invention this is not required. As a matter of fact, by removing some of the lugs from one side of the wheel, the rim may be lifted out of the trough-like depression 35 of the other lugs in which it is cradled without even loosening the other lugs, and a rim may be applied in the same way. For example, two of the lugs 30 can be left in their clamped position when applying the rim. All that it is necessary to do is to properly seat the rim in the troughs 35 and then apply the remaining lugs. These may be tightened in any order and with various amounts of force, about the only requirement being that each lug is moved sufficiently laterally inwardly so as to contact with its abutments 18.

So far as I am aware, this is the first rim mounting using the principle of a predetermined and definite location for the mounting lugs with respect to the other parts used in the construction, and the appended claims are to be accordingly construed.

It is to be understood, of course, that there are a number of spoke ends and an equal number of lugs, all of which operate in the same manner and by the combined expansive action of all of the lugs, the rim is held in a predetermined fixed position relative to the parts involved. It is also to be understood that the principles of the present invention are equally applicable to wheels employing felloes, and in this respect the spoke 1 illustrates and represents any form of spider or wheel body on which it is desired to use the improved rim mounting means described above.

The present invention also contemplates other than the particular form illustrated in the drawings. For example, instead of sliding wedge surfaces 23—30, the lug 3 might be formed with some form of rocking connection so that instead of sliding radially outwardly and laterally inwardly along the surface 23 as a wedge, the lug 30 would act as a toggle. This construction, of course, would require a rocking connection between the outermost portion of the lug and the rim. In either case, however, the present invention contemplates the provision of means for definitely limiting the movement of the lug with respect to the wheel body, thereby at the same time definitely limiting the chording of the rim.

While I have described above the preferred construction in which the principles of the present invention are preferably embodied, it will be apparent that my invention is not to be limited to the specific construction shown and described but that, in fact, widely different means may be employed in the practice of the broader aspects of my invention.

What I claim, therefore, and desire to secure by Letters Patent is:

1. A wheel comprising a wheel body, a rim adapted to be mounted thereon, a plurality of lugs movable with respect to the wheel body for engaging the rim and moving the same clear of the wheel body so that the rim is supported entirely by said lugs, each of said lugs having portions engaging both the rim and the wheel body over areas of contact, the centers of pressure of which are offset with respect to each other to establish an overturning couple effective to free the lugs from the wheel body, the lug portions which engage said rim serving to cause the rim and lugs to move bodily together, means carried by the wheel body and establishing fulcrum abutment to receive said lugs, means for tightening the lug on the wheel body, said means establishing a line of force which is disposed at one side of said fulcrum abutment to establish, when said last named means is tightened, a couple opposing said first named couple for clamping the rim on the wheel, the release of said tightening means rendering said first named couple effective to free the lugs from the wheel body, and stop means for limiting the extent to which said tightening means can shift the lugs with respect to the wheel body.

2. A wheel comprising a wheel body, a rim adapted to be mounted thereon, a plurality of lugs separately mounted on the wheel body and each provided with a radially outwardly disposed portion adapted to seat against a portion of said rim in substantially fixed relation, means forming a plurality of beveled surfaces on said wheel body, said lugs being provided with radially inwardly disposed portions adapted to seat against said beveled surfaces, means reacting against each of the lugs and disposed in a radial direction wholly outwardly of said beveled surfaces and the cooperating inwardly disposed portions of the lugs for tightening the lugs on the wheel body by shifting the same bodily along said beveled surfaces laterally and radially outwardly of the wheel body, thereby tending to expand the rim, said rim moving with said lugs, and stop means on the wheel body and engageable by said lugs for limiting the movement of the latter, whereby the rim is held in a predetermined fixed position relative to the wheel body, said stop means on said lugs comprising planar radial shoulders disposed on opposite sides of said tightening means and extending from said rim engaging portions to said beveled seat engaging portions.

3. A wheel comprising a felloe-less wheel body with spokes, each having at its end a pair of spaced radially outwardly facing sections, the sections of each pair including spaced laterally facing abutment surfaces and a radially outwardly facing beveled section adjacent the radially inner portions of said abutment surfaces, a rim adapted to be mounted over said radially outwardly facing sections, a plurality of clamping lugs having beveled seating surfaces engageable with and movable along said radially outwardly facing beveled sections and rim receiving portions in which the rim is adapted to be carried, the rim receiving portion of each lug being formed to engage the outermost marginal portion of the rim and having a tongue portion adapted to engage underneath said rim, the tongue portion of each lug being adapted to be disposed in between the laterally facing abutment surfaces of the associated spoke end and the portions of the inner face of each lug on opposite sides of said tongue portion being adapted to engage the associated abutment surfaces to limit the lateral movement of each lug, and means for tightening the lugs laterally on the wheel body against the rim, the beveled seating surfaces of said lugs reacting against said radially outwardly facing beveled sections on the spoke ends when said tightening means is drawn up to chord the rim radially outwardly with respect to the wheel body.

4. A wheel comprising a wheel body, a rim adapted to be mounted thereon, lug means movable laterally and radially outwardly of the wheel body and adapted to contact with said rim at a plurality of circumferentially spaced points to chord the rim, each of said lug means having a generally concave socket on its outer face and an enlarged opening, a substantially planar inner face on each of said lug means about said opening, bolt means extending through the openings in said lugs and having nut members with rounded portions seating in the socket of the associated lug means, said concave sockets and rounded portions of the clamping nuts accommodating the angular movement of the bolt means when the lugs are tightened, and radially extending abutment means serving as stop means for engaging said planar face of said lug to limit the chording of the rim and to maintain the latter centered on the wheel body.

5. A wheel comprising a wheel body having radially outwardly facing seats adjacent the periphery thereof and laterally facing abutment surfaces extending radially outwardly from said seats, a rim adapted to be mounted over the wheel body with the gutter portion of the rim adjacent said seats, clamping lugs having seating surfaces engageable with said seats and rim receiving portions in which the gutter portion of the rim is adapted to be cradled, the seats on the wheel body and the seating surfaces on the lugs being inclined so that the rim is chorded as the lugs are shifted laterally and radially outwardly along said seats, the center of contact between the rim and the rim receiving portions of each lug being disposed laterally inwardly of the center of pressure between the seating surface of the lug and the outwardly facing seat on which it is mounted, and means for tightening the lugs laterally on the wheel body to bring the laterally inner face of each lug against the associated abutment surface.

6. A wheel comprising a felloe-less wheel body with spokes, each having at its end a pair of spaced radially outwardly facing sections, the sections of each pair including spaced laterally facing abutment surfaces and a radially outwardly facing beveled section adjacent the radially inner portions of said abutment surfaces, a rim adapted to be mounted over said radially outwardly facing sections, a plurality of clamping lugs having beveled seating surfaces engageable with and movable along said radially outwardly facing beveled sections and rim receiving portions in which the rim is adapted to be carried, portions of the inner face of each lug on opposite sides of said tongue portion being adapted to engage the associated abutment surfaces to limit the lateral movement of each lug, and means disposed between the sections of each pair of spaced radially outwardly facing sections for tightening the lugs laterally on the wheel body against the rim, the beveled seating surfaces of said lugs reacting against said radially outwardly facing beveled sections on the spoke ends when said tightening means is drawn up to chord the rim radially outwardly with respect to the wheel body.

7. A metal wheel comprising a hub and spokes, axially tapered seat portions on said spokes, said spokes having radially straight ends, an overhanging tire rim having a tapered edge, aligning wedge clamps between the tapered edge of the tire and the tapered seats on the spokes to support the rim, shanks on said clamps having spaced parallel radially extending surfaces for engagement with said straight ends of said spokes to guide the applying movement of the clamps to a position in the plane of the wheel to support the rim in a plane at right angles to the wheel and to prevent further axial inward movement of any portion of said clamps.

8. A metal wheel comprising a hub and spokes, axially tapered offset seat portions on said spokes, said spokes having radially straight ends, an overhanging tire rim having a tapered edge, aligning wedge clamps between the tapered edge of the tire rim and the tapered offset seats of the spokes to support the tire rim, a bolting shank formed integral with each of said shanks and having an axial opening therethrough, means on opposite sides of said opening and extending the full radial length of said shanks for engagement with said straight sides of the spoke ends to guide the applying movement of the clamps to a position in a plane normal to the axis of the wheel, and bolts extending through said openings for drawing the clamps axially inwardly against the tapered offset seat portions on the spokes to support the rim in a plane at right angles to the axis of the wheel.

9. A wheel comprising a wheel body having radially outwardly facing seats adjacent the periphery thereof and laterally facing abutment surfaces extending radially outwardly from the seats, a rim adapted to be mounted over the wheel body with the gutter portion of the rim adjacent said seats, clamping lugs having seat surfaces engageable with said seats and rim receiving portions in which the gutter portion of the rim is adapted to be cradled, said rim receiving portions of the lugs being formed to engage the outer marginal portion of the rim so as to exert substantially axially directed forces thereon and to move bodily with the rim, said rim receiving surfaces and said seats being integral so that the rim is chorded as the lugs are shifted laterally and radially outwardly along the seats, the center of contact between the rim and the rim receiving portions of each lug being disposed laterally inwardly of the center of pressure between the seating surfaces of the lug and the outwardly facing seat on which it is mounted, and means for tightening the lugs laterally on the wheel body to bring the entire lateral inner face of each lug against the associated abutment surface to prevent any further lateral inward movement of any part of said lug.

10. In combination, a wheel body having radially projecting spoke ends, a rim adapted to be mounted thereon having a beveled gutter at one edge thereof, each of said spoke ends having a socket provided with radially outwardly extending defining walls, a lug for clamping said rim onto each of said spoke ends having a portion engaging the lateral side wall of said gutter and a lip extending into engagement with said beveled surface of said gutter, a shank extending in a plane substantially parallel to said side wall engaging portion of said lug and having an opening therethrough, means for tightening said lug to move said lug laterally inwardly of said wheel body and simultaneously radially outwardly whereby said rim is moved laterally of said wheel body into predetermined position and chorded radially outwardly, said lug having flat radially extending seating surfaces on opposite sides of said shank opening of substantial extent engaging the defining walls of said socket to limit lateral inward movement of said lug and to maintain said lug in a radially extending position to transmit vertical loads from said rim to said wheel body.

11. In combination, a wheel body having spoke ends provided with radially outwardly extending surfaces, and tapered radially inwardly extending surfaces projecting from the radial inner edges of said first-named surfaces, a rim having a bevel-shaped gutter on the outer edge thereof, lugs having arcuate gutter engaging surfaces and having spaced planar shoulders, and clamp means at said spoke ends for initially moving said lugs laterally inwardly of said wheel body and then rotating said lugs about the gutter engaging portions thereof to bring said planar surfaces of said lugs into abutting engagement with said radially outwardly extending surfaces to prevent further lateral inward movement of any portion of said lugs.

12. In combination, a wheel body having spoke ends provided with radially outwardly extending surfaces, and tapered radially inwardly extending surfaces projecting from the radial inner edges of said first-named surfaces, a rim having a bevel-shaped gutter on the outer edge thereof, lugs having arcuate gutter engaging surfaces and having spaced planar shoulders, clamp means at said spoke ends for initially moving said lugs laterally inwardly of said wheel body and then rotating said lugs about the gutter engaging portions thereof to bring said planar surfaces of said lugs into abutting engagement with said radially outwardly extending surfaces to prevent further lateral inward movement of any portion of said lugs, and means on said lugs opposite said gutter engaging surfaces and engaging said projecting surfaces at said spoke ends for moving said lugs radially outwardly during said rotation thereof to chord said rim radially outwardly whereby said rim is radially supported by said lugs out of engagement with said wheel body.

13. In combination, a wheel body having spokes provided at their ends with planar radially extending face portions, axially tapered bevel surfaces extending outwardly of said spokes at the radial inner ends of said face portions, a tire rim having an internal beveled surface, a plurality of lugs having seating portions for cradling the beveled surface of said rim and depending shank portions provided with tapered surfaces engaging the axially tapered surfaces of said spokes and having radially extending inner face portions, and means for tightening the lugs laterally on the wheel body to move the lugs laterally inwardly and radially outwardly, the face portions of said lugs and spoke ends having abutting engagement radially inwardly of said tightening means.

FREDERICK W. BURGER.